United States Patent
Dindorkar et al.

(10) Patent No.: US 12,184,494 B2
(45) Date of Patent: Dec. 31, 2024

(54) METHODS AND SYSTEMS FOR AUTOMATIC OPEN SHORTEST PATH FIRST (OSPF) CONFIGURATION

(71) Applicant: Nile Global, Inc., San Jose, CA (US)

(72) Inventors: Siddhesh Dindorkar, Sunnyvale, CA (US); Avoy Nanda, Dublin, CA (US); Promode Nedungadi, San Jose, CA (US); Suresh Katukam, Milpitas, CA (US); Venu Hemige, San Ramon, CA (US)

(73) Assignee: Nile Global, Inc., San Jose, CA (US)

( * ) Notice: Subject to any disclaimer, the term of this patent is extended or adjusted under 35 U.S.C. 154(b) by 411 days.

(21) Appl. No.: 17/832,524

(22) Filed: Jun. 3, 2022

(65) Prior Publication Data

US 2023/0396499 A1 Dec. 7, 2023

(51) Int. Cl.
*H04L 41/08* (2022.01)
*H04L 41/0803* (2022.01)

(52) U.S. Cl.
CPC ...... *H04L 41/0886* (2013.01); *H04L 41/0803* (2013.01)

(58) Field of Classification Search
CPC .......... H04L 41/0886; H04L 41/0803
See application file for complete search history.

(56) References Cited

U.S. PATENT DOCUMENTS

| | | |
|---|---|---|
| 8,068,409 B2 | 11/2011 | Kumaresan et al. |
| 8,717,935 B2 | 5/2014 | Lindem, III et al. |
| 8,954,601 B1 * | 2/2015 | Patro ............ H04L 45/02 370/395.31 |
| 10,735,313 B2 | 8/2020 | Bhat et al. |
| 2004/0246948 A1 * | 12/2004 | Lee ............ H04L 45/03 370/254 |
| 2007/0214275 A1 * | 9/2007 | Mirtorabi ........ H04L 45/02 709/230 |
| 2013/0039214 A1 * | 2/2013 | Yedavalli ........ H04L 45/64 370/254 |

* cited by examiner

*Primary Examiner* — Duc C Ho
(74) *Attorney, Agent, or Firm* — LOZA & LOZA LLP

(57) ABSTRACT

Embodiments of a device and method are disclosed. In an embodiment, a method for automatic Open Shortest Path First (OSPF) configuration involves at a first router, receiving OSPF communications from a second router and at the first router, deriving OSPF configuration for the first router based on the received OSPF communications to match OSPF configuration of the second router.

20 Claims, 8 Drawing Sheets

METHODS AND SYSTEMS FOR AUTOMATIC OPEN SHORTEST PATH FIRST (OSPF) CONFIGURATION

BACKGROUND

Growing adoption of networks, such as, enterprise campus networks allows enterprises to increase network coverage and functionality. For example, due to the dynamic nature of the business and campuses, routers/switches, gateways, wireless access points (APs), and client devices, such as, laptops, printers, servers, security cameras, and/or other connected Internet of things (IoT) devices are typically interconnected in a network. Within a network, network protocols are executed by various network devices in the network. For example, Open Shortest Path First (OSPF) is an Interior Gateway Protocol that can be used to exchange route information, for example, among routers belonging to a single autonomous system. Typically, for an OSPF session to be established between two routers, a network administrator needs to configure OSPF settings manually on both routers such that key OSPF parameters at both routers match. However, because router OSPF parameters are manually configured, OSPF configuration is prone to human errors. In some implementations, OSPF configuration spans across different administrative offices. Under such implementations, the coordination of OSPF parameter configuration can be more important to a successful establishment of an OSPF session, and more coordination and more debugging time may be needed. Therefore, there is a need for network technology that can provide efficient and accurate OSPF configuration for network routers.

SUMMARY

Embodiments of a device and method are disclosed. In an embodiment, a method for automatic OSPF configuration involves at a first router, receiving OSPF communications from a second router, and at the first router, deriving OSPF configuration for the first router based on the received OSPF communications to match OSPF configuration of the second router. Other embodiments are also described.

In an embodiment, the method further includes at the first router, transmitting OSPF communications including the derived OSPF configuration for the first router to the second router.

In an embodiment, the OSPF configuration for the first router includes an OSPF area identification (ID).

In an embodiment, the OSPF configuration for the first router includes an OSPF interval.

In an embodiment, the OSPF configuration for the first router includes maximum transfer unit (MTU) information.

In an embodiment, the received OSPF communications from the second router include an OSPF hello packet from the second router.

In an embodiment, the OSPF configuration for the first router includes an OSPF area ID that matches an OSPF ID in the OSPF hello packet from the second router.

In an embodiment, the OSPF configuration for the first router includes an OSPF interval that matches an OSPF interval in the OSPF hello packet from the second router.

In an embodiment, the received OSPF communications from the second router include an OSPF database description (DD) packet from the second router.

In an embodiment, the OSPF configuration for the first router includes an OSPF area ID that matches an OSPF ID in the OSPF DD packet from the second router.

In an embodiment, the OSPF configuration for the first router comprises MTU information that matches MTU information in the OSPF DD packet from the second router.

In an embodiment, at least one of the first and second routers includes an Area Border Router (ABR) or an Autonomous System Border Router (ASBR).

In an embodiment, a router includes a transceiver configured to receive OSPF communications from a second router and a controller connected to the transceiver and configured to derive OSPF configuration for the router based on the received OSPF communications to match OSPF configuration of the second router.

In an embodiment, the transceiver is further configured to transmit OSPF communications including the derived OSPF configuration for the router to the second router.

In an embodiment, the OSPF configuration for the router includes an OSPF area ID, an OSPF interval, or maximum transfer unit (MTU) information.

In an embodiment, the received OSPF communications from the second router include an OSPF hello packet from the second router.

In an embodiment, the OSPF configuration for the router includes an OSPF area ID that matches an OSPF ID in the OSPF hello packet from the second router or an OSPF interval that matches an OSPF interval in the OSPF hello packet from the second router.

In an embodiment, the received OSPF communications from the second router comprise an OSPF DD packet from the second router.

In an embodiment, the OSPF configuration for the router includes an OSPF area identification (ID) that matches an OSPF ID in the OSPF DD packet from the second router or maximum transfer unit (MTU) information that matches MTU information in the OSPF DD packet from the second router.

In an embodiment, a method for automatic Open Shortest Path First (OSPF) configuration involves at a first router, receiving an OSPF hello packet from a second router and at the first router, deriving OSPF configuration for the first router from the OSPF hello packet to match OSPF configuration of the second router, wherein the OSPF configuration for the first router comprises an OSPF area ID or an OSPF interval.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
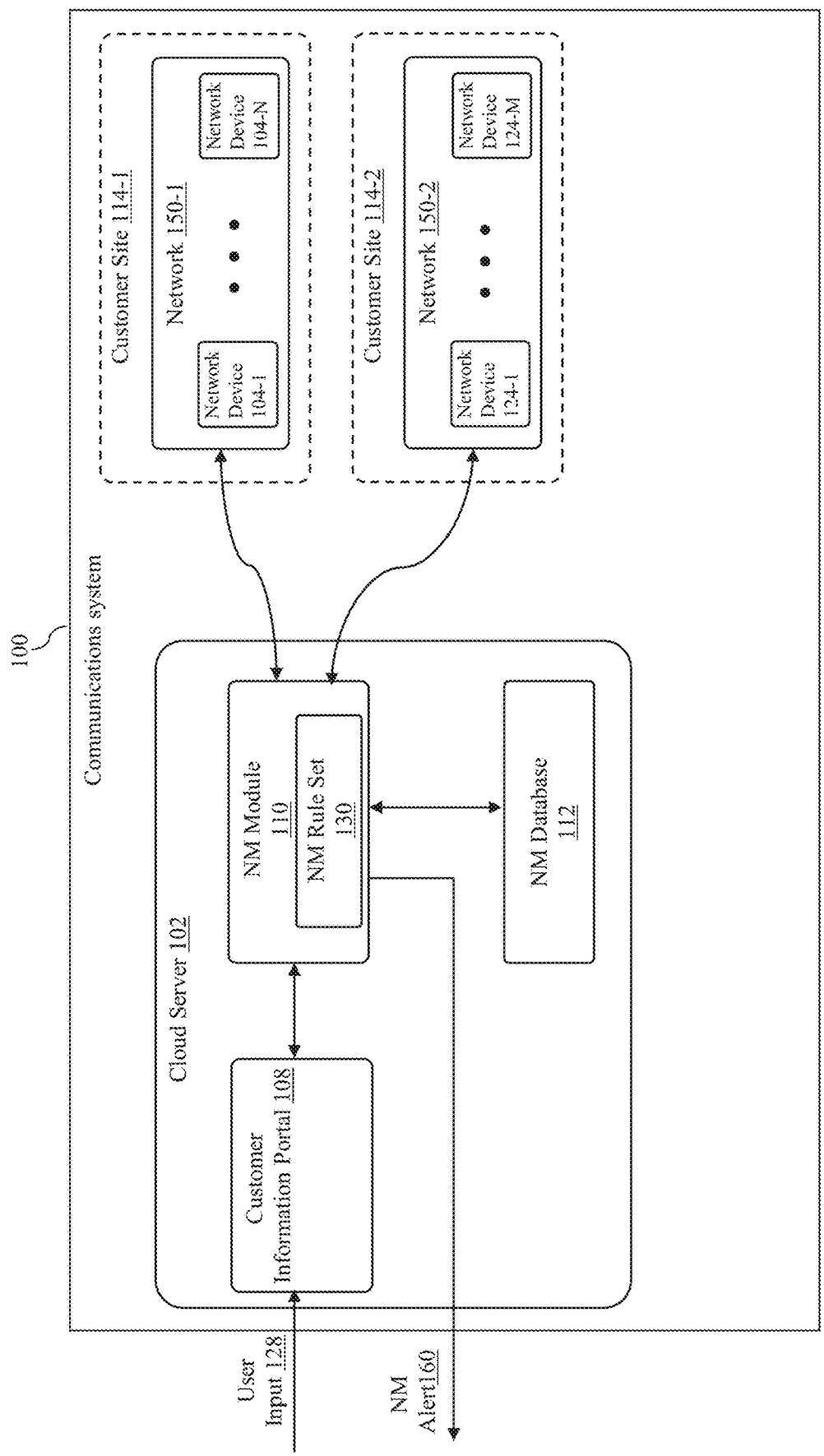
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102, a deployed network 150-1 within a customer site 114-1, and a deployed network 150-2 within a customer site 114-2. The cloud server and/or the deployed networks may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, one deployed network, more than two deployed networks, one customer site, and/or more than two customer sites. In another example, although the cloud server and the deployed networks are shown in FIG. 1 as being connected in certain topology, the network topology of the communications system 100 is not limited to the topology shown in FIG. 1.

The cloud server 102 can be used to provide at least one service to at least one customer site (e.g., to the deployed network 150-1 located at the customer site 114-1 and/or the deployed network 150-2 located at the customer site 114-2). The cloud server may be configured to facilitate or perform an OSPF configuration service to network devices (e.g., the deployed networks 150-1, 150-2) at the customer sites 114-1, 114-2. Because the cloud server can facilitate or perform an OSPF configuration service to network devices at a customer site, network management efficiency can be improved. In addition, because the cloud server can facilitate or perform an OSPF configuration service to network devices at a customer site, a user or customer of the customer site can be notified of network outage. Consequently, network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management (NM) module 110, a customer information portal 108 connected to the NM module 110, and an NM database 112 configured to store NM data. The NM module, the customer information portal, and/or the NM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NM module, more than one customer information portal, and/or more than one NM database. In another example, although the NM module, the customer information portal, and the NM database are shown in FIG. 1 as being connected in certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NM module 110 is configured to facilitate or perform an OSPF configuration service to network devices (e.g., the deployed networks 150-1, 150-2) at the customer sites 114-1, 114-2, for example, using a network management (NM) rule set 130. The NM rule set 130 may include one or more NM rules for network devices at the customer sites 114-1, 114-2, for example, for performing an NM service to network devices at the customer sites 114-1, 114-2. In some embodiments, the NM module 110 is configured to generate and/or transmit at least one NM alert 160 regarding a network deployed and/or to be deployed at a customer site 114-1 or 114-2, for example, to an administrator or a user or customer (e.g., a layperson such as a worker on-site or an end-user such as an employee) at the customer site. In some embodiments, the NM database 112 is configured to store NM data for a network deployed and/or to be deployed at a customer site 114-1 or 114-2 (e.g., a list of network devices deployed or to be deployed at the customer site). For example, the NM database 112 is configured to store NM measurement data and/or a list of specific levels of network availability, coverage and/or capacity for network devices deployed at the customer site 114-1 or 114-2. In some embodiments, the NM database 112 is configured to store the at least one NM alert 160. Because the NM module can facilitate or perform an NM service (e.g., an OSPF configuration service) to network devices at a customer site 114-1 or 114-2, network management efficiency can be improved. In addition, because the NM module can facilitate or perform an NM service to network devices at a customer site, a user or customer (e.g., a layperson such as a worker on-site or an end-user such as an employee) at the customer site can be notified of network conditions or outrages. Consequently, network outage time can be shortened. The customer information portal 108 is configured to receive customer input 128. In some embodiments, the customer information portal is configured to include or generate a user interface that allows a customer to input information related to a customer site (e.g., the floor plan of the customer site 114-1 or 114-2) and/or information associated with an NM service (e.g., an OSPF configuration service) for the customer site, such as one or more specific requirements or restrictions.

In the communications system 100 depicted in FIG. 1, at least one of the customer sites 114-1, 114-2 includes one or more buildings, and each building includes one or more floors. For example, network devices may be designated to be deployed to a specific building, a specific floor within a building, and/or a specific location on a floor of a building.

Network devices that can be deployed at the customer sites 114-1, 114-2 may include any type of suitable network devices. A network device that can be deployed at the customer sites 114-1, 114-2 may be fully or partially implemented as an Integrated Circuit (IC) device. In the embodiment depicted in FIG. 1, the network 150-1 includes one or more network devices 104-1, . . . , 104-N, where N is a positive integer, while the network 150-2 includes one or more network devices 124-1, . . . , 124-M, where M is a positive integer. In some embodiments, at least one of the one or more network devices 104-1, . . . , 104-N and/or the one or more network devices 124-1, . . . , 124-M is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the network devices 104-1, . . . , 104-N and/or the network devices 124-1, . . . , 124-M is compatible with Institute of Electrical and Electronics Engineers (IEEE) 802.3 protocol and/or one or more wireless local area network (WLAN) communications protocols, such as an IEEE 802.11 protocol, and/or a short-range communications protocol, such as Bluetooth. In some embodiments, at least one of the network devices 104-1, . . . , 104-N and/or the network devices 124-1, . . . , 124-M is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the network devices 104-1, . . . , 104-N and/or the network devices 124-1, . . . , 124-M is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, at least one of the networks 150-1, 150-2 includes at least one distribution switch (DS) or distribution layer switch that functions as a bridge between a core layer switch/router and an access layer switch/router, at least one head end (HE) or gateway, at least one access switch (AS) or router that can directly interact with a lower-level device (e.g., a wireless AP), at least one wireless AP, and/or at least one wireless sensor that wirelessly connects to a wireless AP. In some embodiments, at least one of the network devices 104-1, . . . , 104-N and/or the network devices 124-1, . . . , 124-M is a wireless station (STA) that wirelessly connects to a wireless AP. For example, at least one of the network devices 104-1, . . . , 104-N and/or the network devices 124-1, . . . , 124-M may be a laptop, a desktop personal computer (PC), a mobile phone, or other wireless device that supports at least one WLAN communications protocol (e.g., an IEEE 802.11 protocol).

Figure 2:
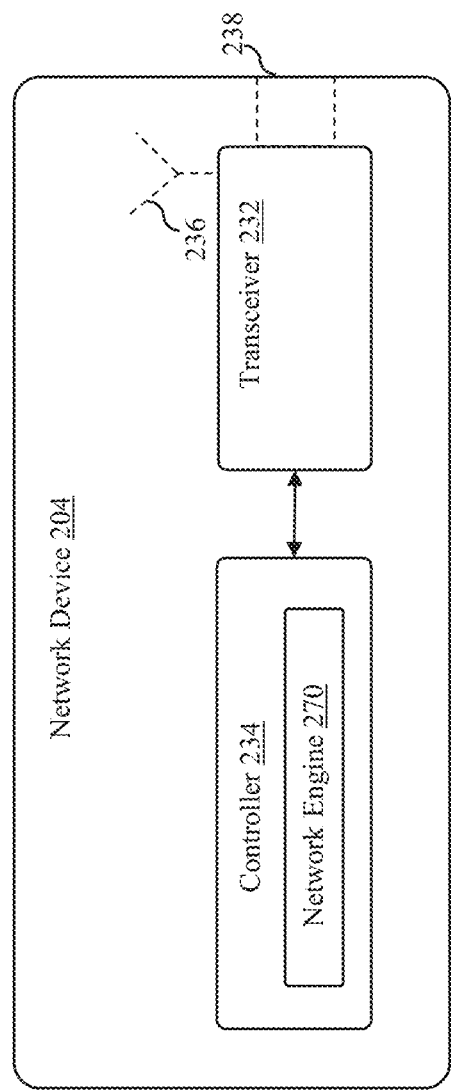
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device 104-1, . . . , or 104-N that is included in the deployed network 150-1 and/or a network device 124-1, . . . , or 124-M that is included in the deployed network 150-2 in FIG. 1. However, network devices that can be included in the deployed networks 150-1, 150-2 depicted in FIG. 1 are not limited to the embodiment depicted in FIG. 2. The network device 204 may be any suitable type of network device. For example, the network device 204 may be a router, a distribution switch (DS), a gateway or headend (HE), an access switch (AS) or router, a wireless access point (AP), a sensor, a laptop, a desktop personal computer (PC), or a mobile phone.

In the embodiment depicted in FIG. 2, the network device 204 includes at least one wireless and/or wired transceiver 232, at least one optional antenna 236 operably connected to the transceiver 232, at least one optional network port 238 operably connected to the transceiver 232, and a controller 234 operably connected to the transceiver 232. In some embodiments, the transceiver 232 includes a physical layer (PHY) device. The transceiver 232 may be any suitable type of transceiver. For example, the transceiver 232 may be an LAN transceiver (e.g., an Ethernet transceiver), a short-range communications transceiver (e.g., a Bluetooth or Bluetooth Low Energy (BLE) transceiver), or a WLAN transceiver (e.g., a transceiver compatible with an IEEE 802.11 protocol). In some embodiments, the network device 204 includes multiple transceivers, for example, an LAN transceiver (e.g., an Ethernet transceiver), a short-range communications transceiver (e.g., a Bluetooth or BLE transceiver), and/or a WLAN transceiver (e.g., a transceiver compatible with an IEEE 802.11 protocol). For example, the network device 204 includes a WLAN transceiver (e.g., a transceiver compatible with an IEEE 802.11 protocol) and a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store information relevant to the network device 204 (e.g., security information relevant to the network device 204, such as, security certificate information). For example, the controller 234 may be configured to obtain and/or store security information relevant to the network device 204 such as security certificate information. In some embodiments, the controller 234 includes a storage device (e.g., one or more hard disks, flash memory modules, solid state disks, and/or optical disks) that contains or stores predefined information (e.g., a predefined security certificate), which may be placed or embedded into the network device during a manufacturing process. In some embodiments, the controller 234 is implemented using at least one processor (e.g., a microcontroller, a DSP, and/or a CPU). In some embodiments, the controller 234 executes one or more Layer 3 or L3 (i.e., the network layer, which is the third level (Layer 3) of the Open Systems Interconnection Model (OSI Model)) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. The controller 234 may include a processor (e.g., a microcontroller, a DSP, and/or a CPU) configured to execute one or more Layer 3 (L3) protocols, and memory that may store information (e.g., an operation system (OS)) for the processor. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a wireless communications device that includes at least one wireless transceiver (e.g., the transceiver 232) and at least one antenna (e.g., the antenna 236). In some embodiments, as a wireless device, the network device 204 includes at least one network port (e.g., the network port 238) that is used to connect to another communication device through at least one cable or wire, for example, at least one Ethernet cable. In some embodiments, the network device 204 is a wired communications device that includes at least one wired transceiver (e.g., the transceiver 232) and at least one network port (e.g., the network port 238) that is used to connect to another communication device through at least one cable or wire, for example, at least one Ethernet cable. In some embodiments, as a wired device, the network device 204 includes a wireless transceiver and at least one antenna (e.g., the antenna 236).

In the embodiment depicted in FIG. 2, the network device 204 (e.g., the controller 234) includes a network engine 270 configured to execute one or more communications protocols. In some embodiments, the network engine 470 is configured to execute Layer 3 (L3) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. In some embodiments, the network engine 270 includes or is implemented using a processor (e.g., a microcontroller, a DSP, and/or a CPU) configured to execute one or more communications protocols (e.g., Layer 3 (L3) protocols), and memory that may store information (e.g., an OS) for the processor. For example, the controller 234 is implemented using a processor and memory, and the network engine 270 is a software module that executes in the processor. In some embodiments, the controller 234 (e.g., the network engine 270) includes a storage device (e.g., one or more hard disks, flash memory modules, solid state disks, and/or optical disks) that contains or stores predefined information (e.g., a predefined security certificate), which may be placed or embedded into the network device 204 during a manufacturing process.

Figure 3:
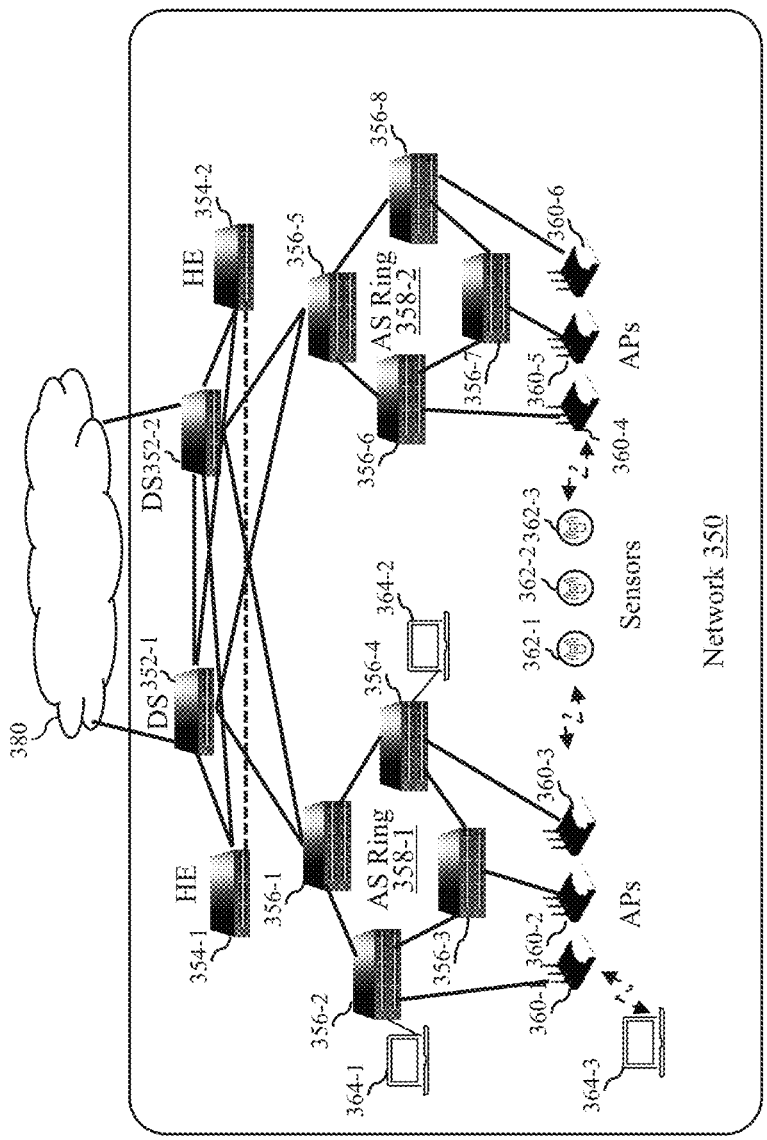
FIG. 3 depicts a network that can be included in the communications system depicted in FIG. 1.

FIG. 3 depicts a network 350 that can be included in the communications system 100 depicted in FIG. 1. The network 350 depicted in FIG. 3 is an embodiment of the networks 150-1, 150-2 depicted in FIG. 1. However, the networks 150-1, 150-2 depicted in FIG. 1 are not limited to the embodiment depicted in FIG. 3. In the embodiment depicted in FIG. 3, the network 350 includes a pair of distribution switches (DSs) or distribution layer switches or routers 352-1, 352-2 that are aggregation switches or routers functioning as a bridge between core layer switches/routers and access layer switches/routers, a pair of head ends (HEs) or gateways 354-1, 354-2, a number of access switches (ASs) or routers 356-1, 356-2, 356-3, 356-4, 356-5, 356-6, 356-7, 356-8 connected in rings 358-1, 358-2 that directly interact with lower level devices (e.g., wireless APs), a number of wireless APs 360-1, 360-2, 360-3, 360-4, 360-5, 360-6 connected to the ASs, a number of wireless sensors 362-1, 362-2, 362-3 that wirelessly connect to the wireless APs, and a number of network devices 364-1, 364-2, 364-3 that are connected to the ASs 356-2, 356-4, and the wireless AP 360-1 through cables or wires, for example, Ethernet cables, or wirelessly. The DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, the wireless sensors 362-1, 362-2, 362-3, and/or the network devices 364-1, 364-2, 364-3 may be an embodiment of the network device 204 depicted in FIG. 2. The network devices 364-1, 364-2, 364-3 may be wired and/or wireless devices, for example, laptops, desktop PCs, or other wired devices. In some embodiments, each of the network devices 364-1, 364-2, 364-3 includes at least one wired transceiver (e.g., the transceiver 232) and at least one network port (e.g., the network port 238) that is used to connect to another communication device through at least one cable or wire, for example, at least one Ethernet cable. In some embodiments, as a wired device, each of the network devices 364-1, 364-2, 364-3 includes a wireless transceiver and at least one antenna (e.g., the antenna 236). In some embodiments, the network 350 also includes at least one wired communications device that is connected to the DS 352-1 or 352-2 through at least one cable or wire, for example, at least one Ethernet cable. In the embodiment depicted in FIG. 3, the DSs 352-1, 352-2 are connected to a network 380 (e.g., the Internet), which is connected to a network management module (e.g., the NM module 110 of the cloud server 102 depicted in FIG. 1). In some embodiments, the DSs 352-1, 352-2, the HEs 354-1, 354-2, and the ASs 356-1, 356-2, 356-3, 356-4, 356-5, 356-6, 356-7, 356-8 constitute a network service block (NSB), which is a basic building block for providing connectivity as a service and is a replicable block that can be scaled (e.g., expanded) to meet any deployment. In some embodiments, the NSB works in Layer 3 or L3 (i.e., the network layer, which is the third level (Layer 3) of the OSI Model) environment and is connected to other wired devices under L3 mode. Although the network 350 is shown with certain components and described with certain functionality herein, other embodiments of the network 350 may include fewer or more components to implement the same, less, or more functionality. For example, in some embodiments, the network 350 includes only one DS, more than two DSs, no HE, only one HE, more than two HEs, less than eight ASs, more than eight ASs, less than six wireless APs, more than six wireless APs, less than three wireless sensors, more than three wireless sensors, more than three network devices, and/or less than three network devices. Although each of the rings 358-1, 358-2 includes four ASs in the embodiment depicted in FIG. 3, in other embodiments, the number of ASs in each of the rings 358-1, 358-2 may be more than four or less than four. In another example, although the network 350 shown in FIG. 3 as being connected in certain topology, the network topology of the network 350 is not limited to the topology shown in FIG. 3. In some embodiments, the number of HEs and DSs is constant in the network 350 while the number of the wireless APs, the ASs, and the sensor(s) in the network 350 varies.

Figure 4:
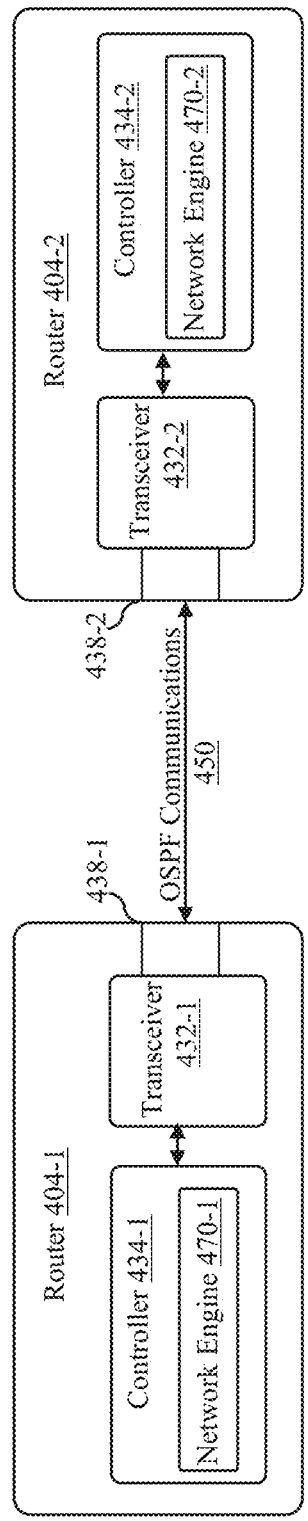
FIG. 4 depicts two routers that can perform automatic OSPF configuration in accordance with an embodiment of the invention.

FIG. 4 depicts two routers 404-1, 404-2 that can perform automatic OSPF configuration in accordance with an embodiment of the invention. The routers 404-1, 404-2 depicted in FIG. 4 are embodiments of the network devices 104-1, . . . , 104-N and/or the network devices 124-1, . . . , 124-M depicted in FIG. 1. However, network devices that can be included in the deployed networks 150-1, 150-2 depicted in FIG. 1 are not limited to the embodiment depicted in FIG. 4.

In the embodiment depicted in FIG. 4, the router 404-1 includes at least one wireless and/or wired transceiver 432-1, at least one network port 438-1 operably connected to the transceiver 432-1, and a controller 434-1 operably connected to the transceiver 432-1, while the router 404-2 includes at least one wireless and/or wired transceiver 432-2, at least one network port 438-2 operably connected to the transceiver 432-2, and a controller 434-2 operably connected to the transceiver 432-2. In some embodiments, each of the transceivers 432-1, 432-2 includes a physical layer (PHY) device. Each of the transceivers 432-1, 432-2 may be any suitable type of transceiver. For example, each of the transceivers 432-1, 432-2 may be an LAN transceiver (e.g., an Ethernet transceiver), a short-range communications transceiver (e.g., a Bluetooth or Bluetooth Low Energy (BLE) transceiver), or a WLAN transceiver (e.g., a transceiver compatible with an IEEE 802.11 protocol). In some embodiments, at least one of the routers 404-1, 404-2 includes multiple transceivers, for example, an LAN transceiver (e.g., an Ethernet transceiver), a short-range communications transceiver (e.g., a Bluetooth or BLE transceiver), and/or a WLAN transceiver (e.g., a transceiver compatible with an IEEE 802.11 protocol). In some embodiments, at least one of the routers 404-1, 404-2 includes multiple antennas and multiple wireless transceivers that share the antennas. In some embodiments, each of the controllers 434-1, 434-2 is configured to control the corresponding transceiver 432-1 or 432-2 to process packets received through the corresponding network port 438-1 or 438-2 and/or to generate outgoing packets to be transmitted through the corresponding network port 438-1 or 438-2. In some embodiments, each of the controllers 434-1, 434-2 is configured to obtain and/or store information relevant to the router 404-1 or 404-2 (e.g., security information relevant to the router 404-1 or 404-2, such as, security certificate information). For example, each of the controllers 434-1, 434-2 may be configured to obtain and/or store security information relevant to the router 404-1 or 404-2 such as security certificate information. In some embodiments, the controller 434-1 or 434-2 includes a storage device (e.g., one or more hard disks, flash memory modules, solid state disks, and/or optical disks) that contains or stores predefined information (e.g., a predefined security certificate), which may be placed or embedded into the network device during a manufacturing process. In some embodiments, each of the controllers 434-1, 434-2 is implemented using at least one processor (e.g., a microcontroller, a DSP, and/or a CPU). In some embodiments, each of the controllers 434-1, 434-2 executes one or more Layer 3 or L3 (i.e., the network layer, which is the third level (Layer 3) of the Open Systems Interconnection Model (OSI Model)) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. Each of the controllers 434-1, 434-2 may include a processor (e.g., a microcontroller, a DSP, and/or a CPU) configured to execute one or more Layer 3 (L3) protocols, and memory that may store information (e.g., an operation system (OS)) for the processor. The network port 438-1 or 438-2 may be any suitable type of port. For example, the network port 438-1 or 438-2 may be a local area network (LAN) network port such as an Ethernet port. However, the network port 438-1 or 438-2 is not limited to LAN network ports. In some embodiments, the router 404-1 or 404-2 is a wireless communications device that includes at least one wireless transceiver (e.g., the transceiver 432-1 or 432-2) and at least one antenna, which may be any suitable type of antenna. For example, the antenna may be an induction type antenna such as a loop antenna or any other suitable type of induction type antenna. However, the antenna is not limited to an induction type antenna. In some embodiments, as a wireless device, the router 404-1 or 404-2 includes at least one network port (e.g., the network port 438-1 or 438-2) that is used to connect to another communication device through at least one cable or wire, for example, at least one Ethernet cable. In some embodiments, the router 404-1 or 404-2 is a wired communications device that includes at least one wired transceiver (e.g., the transceiver 432-1 or 432-2) and at least one network port (e.g., the network port 438-1 or 438-2) that is used to connect to another communication device through at least one cable or wire, for example, at least one Ethernet cable. In some embodiments, as a wired device, the router 404-1 or 404-2 includes a wireless transceiver and at least one antenna. In the embodiment depicted in FIG. 4, the router 404-1 or 404-2 (e.g., the controller 434-1 or 434-2) includes a network engine 470-1 or 470-2 configured to execute one or more communications protocols. In some embodiments, each of the network engines 470-1, 470-2 is configured to execute Layer 3 (L3) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. In some embodiments, each of the network engines 470-1, 470-2 includes or is implemented using a processor (e.g., a microcontroller, a DSP, and/or a CPU) configured to execute one or more communications protocols (e.g., Layer 3 (L3) protocols), and memory that may store information (e.g., an OS) for the processor. For example, the controller 434-1 or 434-2 is implemented using a processor and memory, and the network engine 470-1 or 470-2 is a software module that executes in the processor. In some embodiments, the controller 434-1 or 434-2 (e.g., the network engine 470-1 or 470-2) includes a storage device (e.g., one or more hard disks, flash memory modules, solid state disks, and/or optical disks) that contains or stores predefined information (e.g., a predefined security certificate), which may be placed or embedded into the router 404-1 or 404-2 during a manufacturing process.

In the embodiment depicted in FIG. 4, in order to reduce OSPF configuration and debugging overhead, one of the routers 404-1, 404-2 snoops or processes incoming OSPF communications 450 from another router 404-1 or 404-2 and determines or derives key OSPF parameters that are required to establish an OSPF session from the OSPF communications 450. By snooping incoming OSPF packets and determining key OSPF parameters that are required to establish an OSPF session at one of the routers 404-1, 404-2, OSPF parameters only need to be configured on one of the routers 404-1, 404-2, not on both routers 404-1, 404-2. If one of the key parameters changes on either of the routers 404-1, 404-2, the other router detects the change based on new OSPF packets received from the router with the changed parameter and adjusts its own OSPF configuration to match the configuration of the router with the changed parameter. By deriving OSPF configuration for a router based on received OSPF communications from another router to match OSPF configuration of another router, OSPF configuration can be automatically performed for the router without human intervention such that an OSPF session can be established and/or maintained between the routers 404-1, 404-2. Consequently, OSPF configuration efficiency can be improved, manual OSPF configuration can be avoided, and OSPF configuration error can be reduced.

For example, OSPF parameters are configured on the router 404-1, and the router 404-2 mimics the OSPF configuration of the router 404-1 based on OSPF packets that are sent by the router 404-1, for example, by snooping incoming OSPF packets from the router 404-1 and determining key OSPF parameters that are required to establish an OSPF session between the routers 404-1, 404-2. In this example, not only the manual OSPF configuration needed on the router 404-2 is avoided, but also operator errors and debugging effort required to monitor and keep an OSPF session alive between the routers 404-1, 404-2 can be avoided. If an OSPF parameter changes on the router 404-1, the other router 404-2 detects the change based on new OSPF packets received from the router 404-1 and adjusts its own OSPF configuration to match the configuration of the router 404-1, for example, by changing its corresponding OSPF parameter to match the changed OSPF parameter of the router 404-1. In some embodiments, the transceiver 432-2 is configured to receive OSPF communications from the router 404-1 and the controller 434-2 (e.g., the network engine 470-2) is configured to derive OSPF configuration for the router 404-2 based on the received OSPF communications to match OSPF configuration of the router 404-1. The transceiver 432-2 may be further configured to transmit OSPF communications including the derived OSPF configuration for the router 404-2 to the router 404-1, for example, to establish an OSPF session between the routers 404-1, 404-2. In some embodiments, the OSPF configuration derived for the router 404-2 includes an OSPF area identification (ID), an OSPF interval, and/or maximum transfer unit (MTU) information. In some embodiments, the transceiver 432-2 receives an OSPF hello packet from the router 404-1, and the controller 434-2 (e.g., the network engine 470-2) derives, from the OSPF hello packet, an OSPF area identification (ID) that matches (i.e., is identical with) an OSPF ID in the OSPF hello packet from the router 404-1 and/or an OSPF interval that matches (i.e., is identical with) an OSPF interval in the OSPF hello packet from the router 404-1. In some embodiments, the transceiver 432-2 receives an OSPF database description (DD) packet from the router 404-1, and the controller 434-2 (e.g., the network engine 470-2) derives, from the OSPF DD packet, an OSPF area ID that matches (i.e., is identical with) an OSPF ID in the OSPF DD packet from the router 404-1 and/or MTU information that matches (i.e., is identical with) MTU information in the OSPF DD packet from the router 404-1. By deriving OSPF configuration for the router 404-2 based on received OSPF communications from the router 404-1 to match OSPF configuration of the router 404-1, OSPF configuration can be automatically performed for the router 404-2 without human intervention such that an OSPF session can be established and/or maintained between the routers 404-1, 404-2. Consequently, OSPF configuration efficiency can be improved, manual OSPF configuration can be avoided, and OSPF configuration error can be reduced.

Alternatively, OSPF parameters are configured on the router 404-2, and the router 404-1 mimics the OSPF configuration of the router 404-2 based on OSPF packets that are sent by the router 404-2, for example, by snooping incoming OSPF packets from the router 404-2 and determining key OSPF parameters that are required to establish an OSPF session between the routers 404-1, 404-2. In this example, not only the manual OSPF configuration needed on the router 404-1 is avoided, but also operator errors and debugging effort required to monitor and keep an OSPF session alive between the routers 404-1, 404-2 can be avoided. If an OSPF parameter changes on the router 404-2, the other router 404-1 detects the change based on new OSPF packets received from the router 404-2 and adjusts its own OSPF configuration to match the configuration of the router 404-2, for example, by changing its corresponding OSPF parameter to match the changed OSPF parameter of the router 404-2. In some embodiments, the transceiver 432-1 is configured to receive OSPF communications from the router 404-2 and the controller 434-1 (e.g., the network engine 470-1) is configured to derive OSPF configuration for the router 404-1 based on the received OSPF communications to match OSPF configuration of the router 404-2. The transceiver 432-1 may be further configured to transmit OSPF communications including the derived OSPF configuration for the router 404-1 to the router 404-2, for example, to establish an OSPF session between the routers 404-1, 404-2, for example, to establish an OSPF session between the routers 404-1, 404-2. In some embodiments, the OSPF configuration derived for the router 404-1 includes an OSPF area ID, an OSPF interval, and/or MTU information. In some embodiments, the transceiver 432-1 receives an OSPF hello packet from the router 404-2, and the controller 434-1 (e.g., the network engine 470-1) derives, from the OSPF hello packet, an OSPF area ID that matches (i.e., is identical with) an OSPF ID in the OSPF hello packet from the router 404-2 and/or an OSPF interval that matches (i.e., is identical with) an OSPF interval in the OSPF hello packet from the router 404-2. In some embodiments, the transceiver 432-1 receives an OSPF DD packet from the router 404-2, and the controller 434-1 (e.g., the network engine 470-1) derives, from the OSPF DD packet, an OSPF area ID that matches (i.e., is identical with) an OSPF ID in the OSPF DD packet from the router 404-2 and/or MTU information that matches (i.e., is identical with) MTU information in the OSPF DD packet from the router 404-2. By deriving OSPF configuration for the router 404-1 based on received OSPF communications from the router 404-2 to match OSPF configuration of the router 404-2, OSPF configuration can be automatically performed for the router 404-1 without human intervention such that an OSPF session can be established and/or maintained between the routers 404-1, 404-2. Consequently, OSPF configuration efficiency can be improved, manual OSPF configuration can be avoided, and OSPF configuration error can be reduced.

In some embodiments, OSPF communications between the router 404-1 and the router 404-2 are encrypted with one or more specific encryption algorithms. For example, Message Digest (MD5) and/or Secure Hash Algorithm (SHA) based encryption algorithms can be used to encrypt OSPF communications. In some embodiments, when OSPF communications are encrypted, the router 404-1 and the router 404-2 configure or set an authentication algorithm and a corresponding passphrase and/or secret key, which is then used to decrypt the OSPF packets and match OSPF configuration as determined from OSPF communications.

Figure 5:
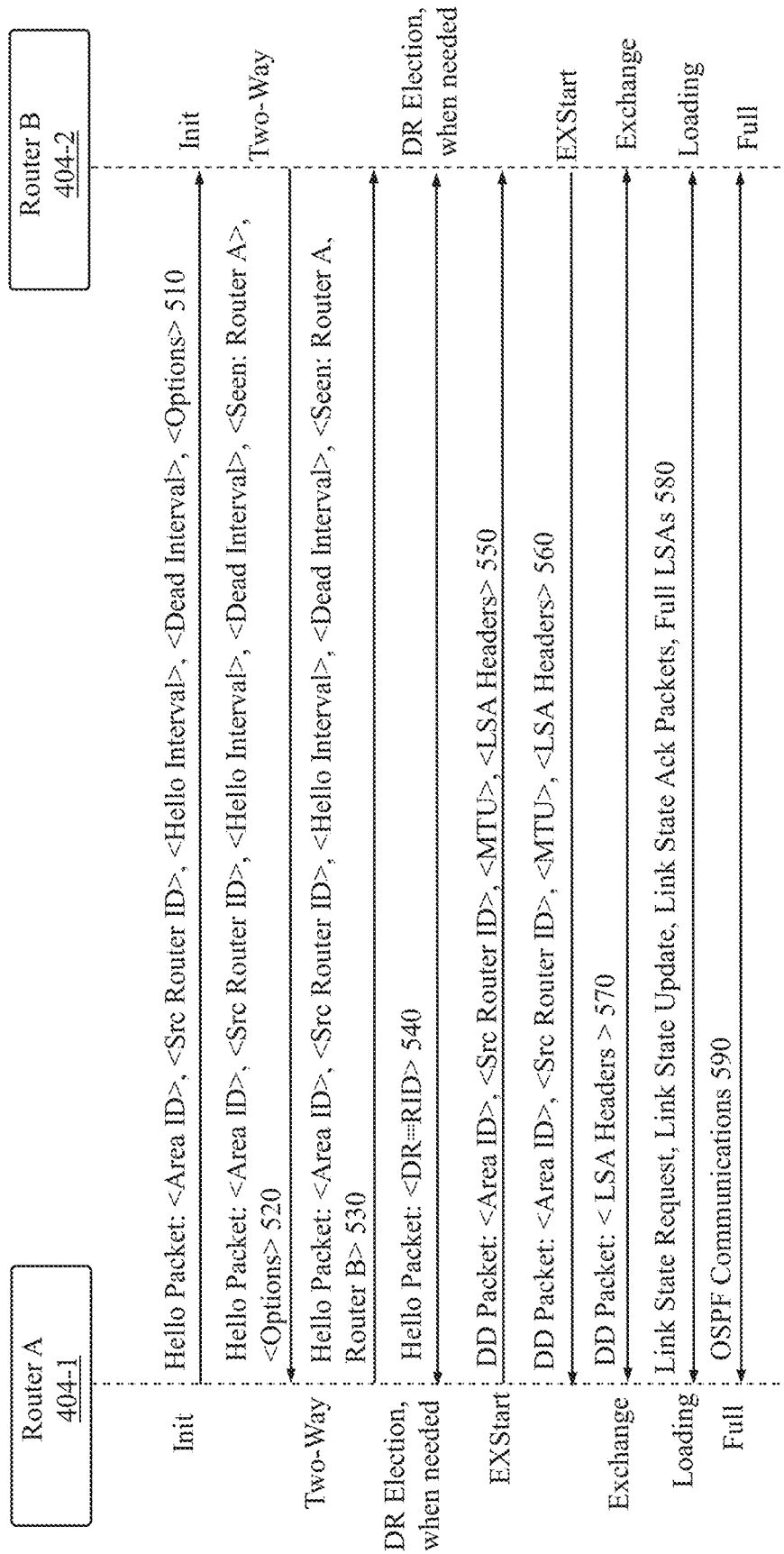
FIG. 5 depicts a packet flow diagram for deriving OSPF configuration and establishing an OSPF session between the routers in FIG. 4.

FIG. 5 depicts a packet flow diagram for deriving OSPF configuration and establishing an OSPF session between the routers 404-1, 404-2 in FIG. 4 in accordance with an embodiment of the invention. In the embodiment depicted in FIG. 5, OSPF packets are exchanged between the routers 404-1, 404-2 for reaching full OSPF adjacency. Although operations in the packet flow diagram in FIG. 5 are described in a particular order, in some embodiments, the order of the operations in the packet flow diagram may be altered so that certain operations may be performed in an inverse order or so that certain operations may be performed, at least in part, concurrently with other operations.

In the packet flow diagram depicted in FIG. 5, the router 404-1 (i.e., router A) initializes OSPF communications with the router 404-2 (i.e., router B) firstly at operation 502. Specially, the router 404-1 (i.e., router A) transmits a Hello Packet 510 that contains an Area ID, a source (Src) Router ID, a Hello Interval data field, a Dead Interval data field, and an Options data field to the router 404-2 (i.e., router B) at the init state of the OSPF session. In an embodiment, the Area ID is the ID of the area where the advertising router (i.e., the router 404-1 (router A)) resides. In an embodiment, the source (Src) Router ID is the ID of the advertising router (i.e., the router 404-1 (router A)). In an embodiment, the Hello Interval data field contains time interval information for sending hello packets. If two routers have different hello intervals, these two routers cannot become neighbors and an OSPF session cannot be established between these two routers. In an embodiment, the Dead Interval data field contains time duration information before declaring a silent router down. If two routers have different dead intervals, these two routers cannot become neighbors and an OSPF session cannot be established between these two routers. In an embodiment, the Options data field contains other information, for example, router priority information, designated router information (e.g., IP address), backup designated router information (e.g., IP address), and/or neighbor information (e.g., router ID of a neighbor router).

After receiving the Hello Packet 510 from the router 404-1 (i.e., router A), the router 404-2 (i.e., router B) copies the Area ID, the value of the Hello Interval data field, the value of the Dead Interval data field, and the value of the Options data field from the Hello Packet 510 into corresponding Area ID, the Hello Interval data field, the Dead Interval data field, and the Options data field of a Hello packet 520 and transmits the Hello packet 520 to the router 404-1 (i.e., router A) at the Two-Way state of the OSPF session. Because the router 404-2 (i.e., router B) copies the Area ID, the value of the Hello Interval data field, the value of the Dead Interval data field, and the value of the Options data field from the Hello Packet 510, the OSPF parameters of the router 404-2 (i.e., router B) are identical with the OSPF parameters of the router 404-1 (i.e., router A). After receiving the Hello Packet 520 from the router 404-2 (i.e., router B), the router 404-1 (i.e., router A) transmits a Hello packet 530 having the Area identification (ID), the source (Src) Router ID, the Hello Interval data field, the Dead Interval data field, the Options data field, and a data field containing "Seen: router A, Route B" (which indicates that Router A in Router B's list of neighbors) to the router 404-2 (i.e., router B) at the Two-Way state of the OSPF session.

In some embodiments, a Designated Router (DR) state takes place after the Two-Way state of the OSPF session. For example, in a multi-access network, the OSPF session has to elect a DR) and a Backup Designated Router (BDR), for example, by exchanging a Hello packet 540 having a router ID (RID) data field.

In an ExStart state of the OSPF session, master and slave roles are determined for the router 404-1 (i.e., router A) and the router 404-2 (i.e., router B). Specifically, the router 404-1 (i.e., router A) transmits a database description (DD) packet 550 having the Area identification (ID), the source (Src) Router ID, maximum transfer unit (MTU) data field, and Link State Acknowledgment (LSA) headers to the router 404-2 (i.e., router B). In an embodiment, the interface MTU data field Specifies the largest IP datagram in bytes that the network interface/the transceiver can send without fragmentation. In an embodiment, Link State Acknowledgment (LSAck) packets are used to acknowledge received Link State Update (LSU) packets.

After receiving the DD Packet 550 from the router 404-1 (i.e., router A), the router 404-2 (i.e., router B) copies the Area ID and the value of the MTU data field into corresponding Area ID and the MTU data field of a DD packet 570 and transmits the DD packet 560 to the router 404-1 (i.e., router A) at the ExStart state of the OSPF session. Because the router 404-2 (i.e., router B) copies the Area ID and the MTU data field from the DD Packet 560, the OSPF parameters of the router 404-2 (i.e., router B) are identical with the OSPF parameters of the router 404-1 (i.e., router A).

In a subsequent exchange state of the OSPF session, database description packets (DBD), for example, a DD packet 570 having LSA headers, are sent between the router 404-1 (i.e., router A) and the router 404-2 (i.e., router B). In a subsequent Loading state of the OSPF session, Link state request (LSR), Link state update (LSU), Link State Acknowledgment (LSAck), and full LSA packets 580 are exchanged between the router 404-1 (i.e., router A) and the router 404-2 (i.e., router B). In a subsequent Full state of the OSPF session, the router 404-1 (i.e., router A) and the router 404-2 (i.e., router B) establish OSPF adjacency.

In some embodiments, OSPF communications between the router 404-1 (i.e., router A) and the router 404-2 (i.e., router B) are encrypted with one or more specific encryption algorithms. For example, Message Digest (MD5) and/or Secure Hash Algorithm (SHA) based encryption algorithms can be used to encrypt OSPF communications. In some embodiments, when OSPF communications are encrypted, the router 404-1 (i.e., router A) and the router 404-2 (i.e., router B) configure or set an authentication algorithm and a corresponding passphrase and/or secret key, which is then used to decrypt the OSPF packets and match OSPF configuration as determined from the hello packet 510 and the database description (DD) packet 550.

Figure 6:
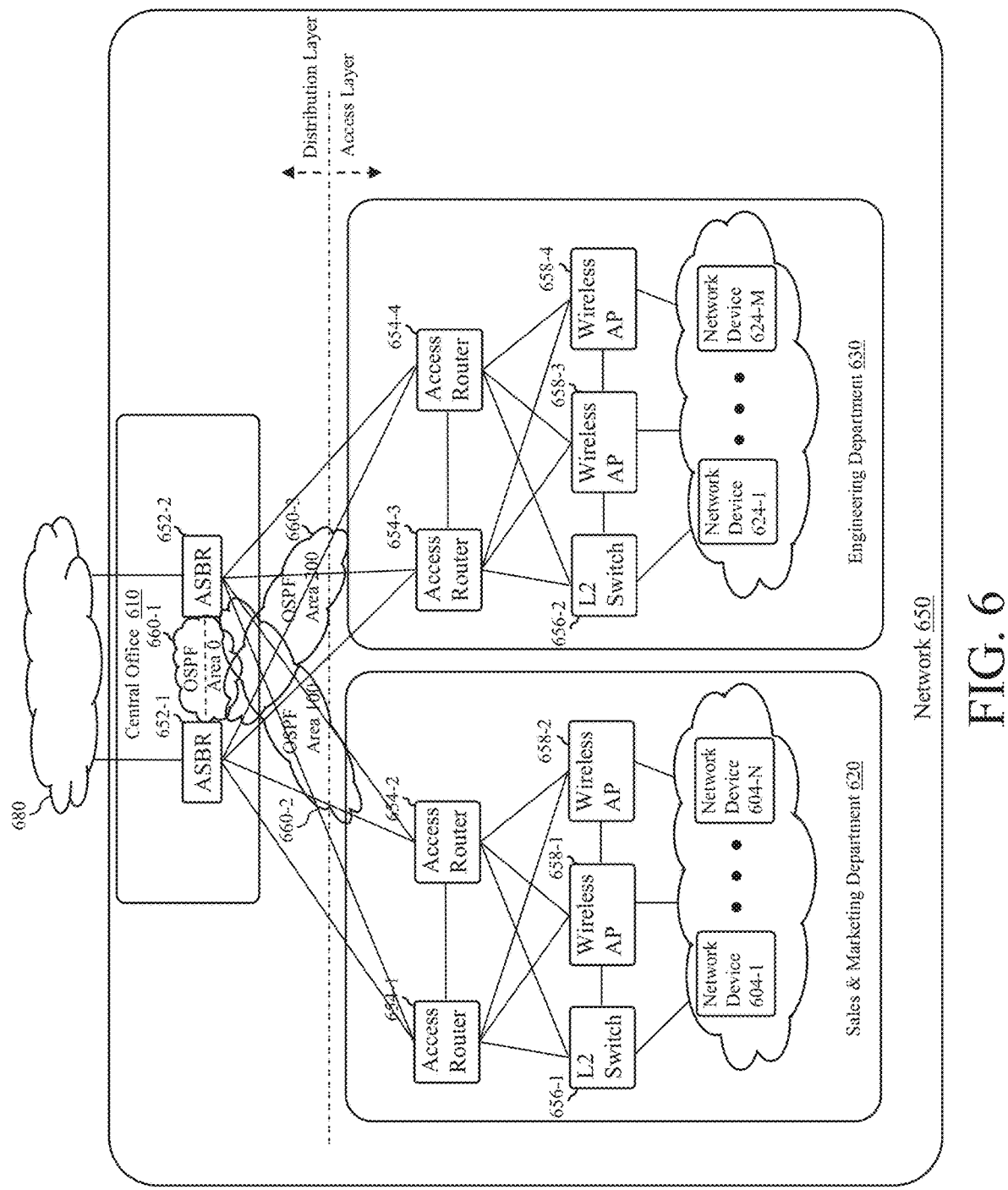
FIG. 6 depicts a network that includes multiple branches in which automatic OSPF configuration can be implemented.

In some embodiments, automatic OSPF configuration is implemented in a network with multiple branches. FIG. 6 depicts a network 650 that includes a central office 610, a sales & marketing department 620, and an engineering department 630 in which automatic OSPF configuration can be implemented. The central office 610, the sales & marketing department 620, and the engineering department 630 can reside in separate customer sites and/or physical locations. In the embodiment depicted in FIG. 6, the central office 610 includes two Area Border Routers (ABRs) or Autonomous System Border Routers (ASBRs) 652-1, 652-2, the sales & marketing department 620 includes two access routers 654-1, 654-2, a Layer 2 (L2) switch 656-1, two wireless APs 658-1, 658-2, and at least one network device 604-1, . . . , 604-N, where N is a positive integer, and the engineering department 630 includes two access routers 654-3, 654-4, a Layer 2 (L2) switch 656-2, two wireless APs 658-3, 658-4, and at least one network device 624-1, . . . , 624-M, where M is a positive integer. A separate OSPF area is configured for each administrative department 620 or 630. In the embodiment depicted in FIG. 6, the routers 654-1, 654-2 in the Sales and Marketing Department are configured with an OSPF area 660-2 having an Area ID of 100, while the routers 654-3, 654-4 in the Engineering Department 630 are configured with an OSPF area 660-3 having an Area ID of 200. Routes between two non-zero Area IDs must be exchanged by Area Border Routers (ABRs) or Autonomous System Border Routers (ASBRs) 652-1, 652-2. The ABRs or ASBRs are configured with an OSPF area 660-1 having an Area ID 0 to help exchange routes between routers in different OSPF areas with non-zero Area IDs. In the example depicted in FIG. 6, automatic OSPF configuration is implemented between routers in the network 650. Consequently, there is no need for a network administrator from the Distribution Layer or the central office 610 to coordinate with administrators at the Sales & Marketing Department 620 and the Engineering Department 630 in the access layer to decide and configure the same OSPF parameters on the ASBRs 652-1, 652-2 and the access routers 654-1, 654-2, 654-3, 654-4. Once the configuration is performed, OSPF hello packets are exchanged between two routers, which negotiate and match OSPF configuration parameters. Hello packets can also be used to maintain the OSPF session and to validate that OSPF configuration continues to match between two routers. For an OSPF session to be established and/or maintained between two routers, key parameters, such as, Area ID, Area type, Hello Interval, Dead Interval and MTU size must match for both routers. If any of these parameters does not match (i.e., is identical) for both routers, an OSPF session cannot established until the values match or a valid OSPF session may be terminated when an OSPF value changes on either router. Automatic OSPF configuration (e.g., by detecting and matching OSPF parameters from OSPF hello or DD packets) can be performed between two ABRs or ASBRs 652-1, 652-2, between either of the ABR/ASBR routers 652-1, 652-2 and either of the access routers 654-1, 654-2, 654-3, 654-4, between the access router 654-1 and the access router 654-2, and between the access router 654-3 and the access router 654-4, to ensure that key parameters, such as, Area ID, Area type, Hello Interval, Dead Interval and MTU size match for both routers. For example, OSPF is firstly configured in the ABR or ASBR 652-1 or 652-2. Subsequently, automatic OSPF configuration (e.g., by detecting and matching OSPF parameters from OSPF hello or DD packets) is performed between two ABRs or ASBRs 652-1, 652-2 to ensure that key parameters, such as, Area ID, Area type, Hello Interval, Dead Interval and MTU size match for both routers. For example, each of the ABRs or ASBRs 652-1, 652-2 has more than one area ID configured, and the process for detecting OSPF configuration is repeated for each OSPF session (per area (e.g., once for area ID 100 and once for area ID 200)). Subsequently automatic OSPF configuration (e.g., by detecting and matching OSPF parameters from OSPF hello or DD packets) is performed between either of the ABR/ASBR routers 652-1, 652-2 and either of the access routers 654-1, 654-2, 654-3, 654-4 to ensure that key parameters, such as, Area ID, Area type, Hello Interval, Dead Interval and MTU size match for both routers. Consequently, once OSPF is firstly configured in the ABR or ASBR 652-1 or 652-2, identical OSPF configuration is propagated to every router in the network 650.

Figure 7:
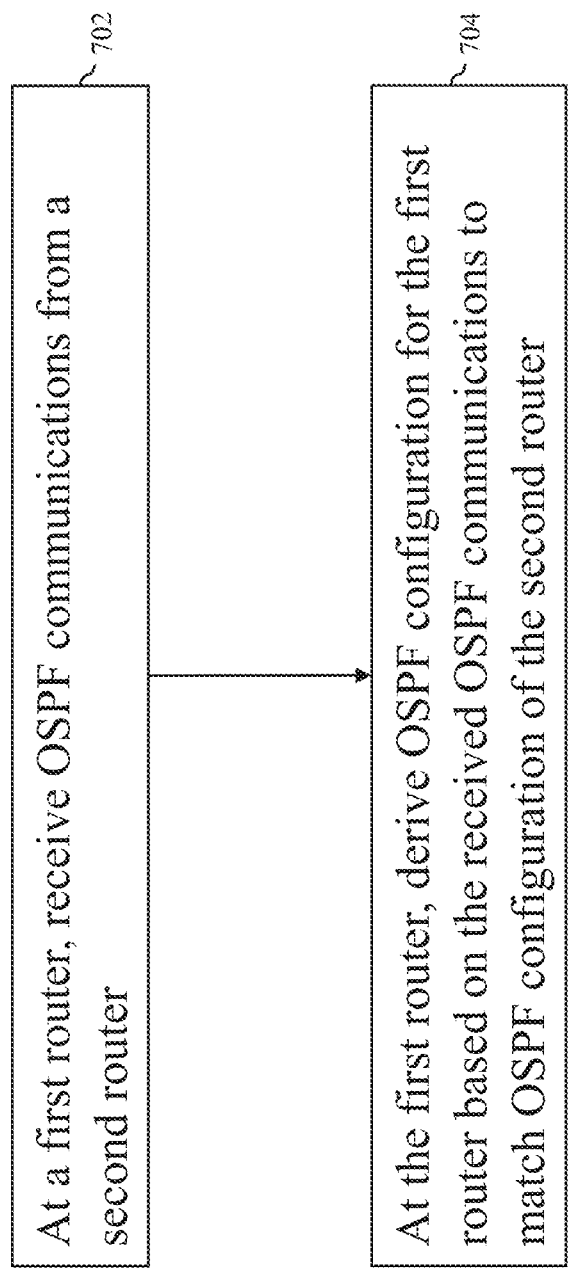
FIG. 7 is a process flow diagram of a method for automatic OSPF configuration in accordance to an embodiment of the invention.

FIG. 7 is a process flow diagram of a method for automatic OSPF configuration in accordance to an embodiment of the invention. According to the method, at block 702, at a first router, OSPF communications are received from a second router. At block 704, at the first router, OSPF configuration for the first router is derived based on the received OSPF communications to match OSPF configuration of the second router. By deriving OSPF configuration for the first router based on received OSPF communications from the second router to match OSPF configuration of the second router, OSPF configuration can be automatically performed for the first router without human intervention such that an OSPF session can be established and/or maintained between the first and second routers. Consequently, OSPF configuration efficiency can be improved, manual OSPF configuration can be avoided, and OSPF configuration error can be reduced. In some embodiments, at the first router, OSPF communications including the derived OSPF configuration for the first router are transmitted to the second router, for example, to establish an OSPF session with the second router. In some embodiments, the OSPF configuration for the first router includes an OSPF area ID. In some embodiments, the OSPF configuration for the first router includes an OSPF interval. In some embodiments, the OSPF configuration for the first router includes MTU information.

In some embodiments, the received OSPF communications from the second router include an OSPF hello packet from the second router. In some embodiments, the OSPF configuration for the first router includes an OSPF area ID that matches (i.e., is identical with) an OSPF ID in the OSPF hello packet from the second router. In some embodiments, the OSPF configuration for the first router includes an OSPF interval that matches (i.e., is identical with) an OSPF interval in the OSPF hello packet from the second router. In some embodiments, the received OSPF communications from the second router include an OSPF DD packet from the second router. In some embodiments, the OSPF configuration for the first router includes an OSPF area ID that matches (i.e., is identical with) an OSPF ID in the OSPF DD packet from the second router. In some embodiments, the OSPF configuration for the first router includes MTU information that matches (i.e., is identical with) MTU information in the OSPF DD packet from the second router. In some embodiments, at least one of the first and second routers includes an ABR or an ASBR. The first router and/or the second router may be similar to, the same as, or a component of the routers 404-1, 404-2 depicted in FIGS. 4 and 5, and/or the ABR/ASBR routers 652-1, 652-2 and the access routers 654-1, 654-2, 654-3, 654-4 depicted in FIG. 6.

Figure 8:
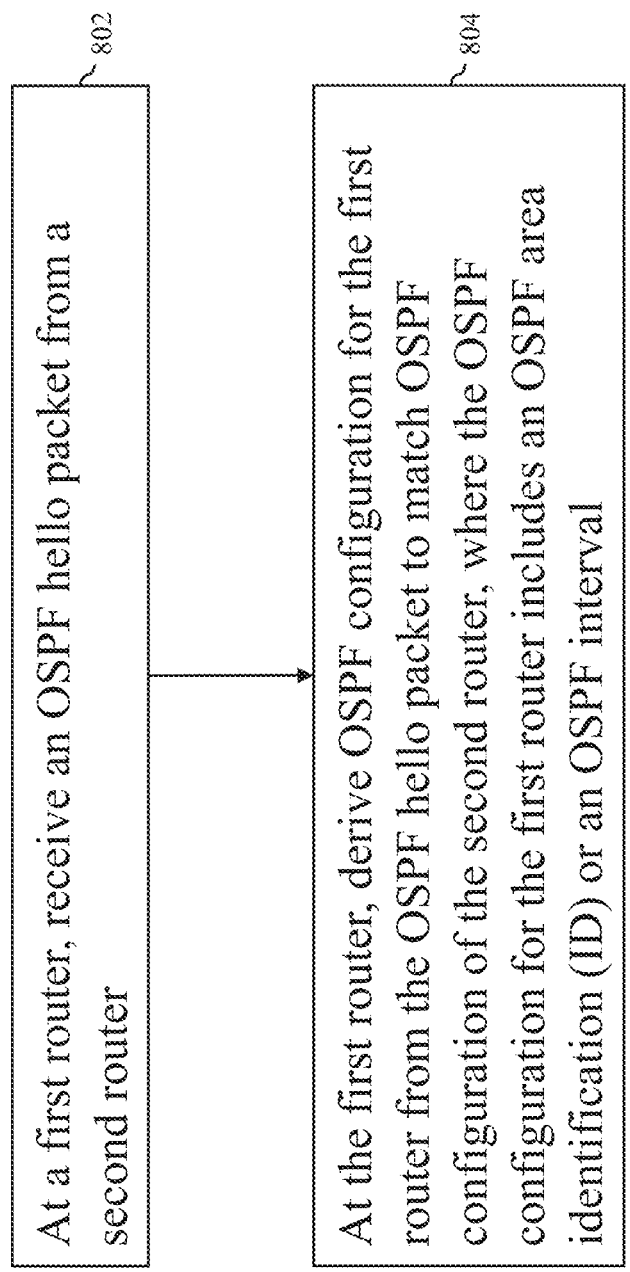
FIG. 8 is a process flow diagram of a method for automatic OSPF configuration in accordance to an embodiment of the invention.

FIG. 8 is a process flow diagram of a method for automatic OSPF configuration in accordance to an embodiment of the invention. According to the method, at block 802, at a first router, an OSPF hello packet is received from a second router. At block 804, at the first router, OSPF configuration for the first router is derived from the OSPF hello packet to match OSPF configuration of the second router, where the OSPF configuration for the first router includes an OSPF area ID or an OSPF interval. By deriving an OSPF area ID and/or an OSPF interval for the first router from a received OSPF hello packet from the second router to match an OSPF area ID and/or an OSPF interval of the second router, OSPF configuration can be automatically performed for the first router without human intervention such that an OSPF session can be established and/or maintained between the first and second routers. Consequently, OSPF configuration efficiency can be improved, manual OSPF configuration can be avoided, and OSPF configuration error can be reduced. The first router and/or the second router may be similar to, the same as, or a component of the routers 404-1, 404-2 depicted in FIGS. 4 and 5, and/or the ABR/ASBR routers 652-1, 652-2 and the access routers 654-1, 654-2, 654-3, 654-4 depicted in FIG. 6.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for automatic Open Shortest Path First (OSPF) configuration, the method comprising:
   at a first router, receiving OSPF communications from a second router; and
   at the first router, deriving OSPF configuration for the first router based on the received OSPF communications to match OSPF configuration of the second router.

2. The method of claim 1, further comprising at the first router, transmitting OSPF communications including the derived OSPF configuration for the first router to the second router.

3. The method of claim 1, wherein the OSPF configuration for the first router comprises an OSPF area identification (ID).

4. The method of claim 1, wherein the OSPF configuration for the first router comprises an OSPF interval.

5. The method of claim 1, wherein the OSPF configuration for the first router comprises maximum transfer unit (MTU) information.

6. The method of claim 1, wherein the received OSPF communications from the second router comprise an OSPF hello packet from the second router.

7. The method of claim 6, wherein the OSPF configuration for the first router comprises an OSPF area identification (ID) that matches an OSPF ID in the OSPF hello packet from the second router.

8. The method of claim 6, wherein the OSPF configuration for the first router comprises an OSPF interval that matches an OSPF interval in the OSPF hello packet from the second router.

9. The method of claim 1, wherein the received OSPF communications from the second router comprise an OSPF database description (DD) packet from the second router.

10. The method of claim 9, wherein the OSPF configuration for the first router comprises an OSPF area identification (ID) that matches an OSPF ID in the OSPF DD packet from the second router.

11. The method of claim 9, wherein the OSPF configuration for the first router comprises maximum transfer unit (MTU) information that matches MTU information in the OSPF DD packet from the second router.

12. The method of claim 1, wherein at least one of the first and second routers comprises an Area Border Router (ABR) or an Autonomous System Border Router (ASBR).

13. A router, the router comprising:
   a transceiver configured to receive OSPF communications from a second router; and
   a controller connected to the transceiver and configured to derive OSPF configuration for the router based on the received OSPF communications to match OSPF configuration of the second router.

14. The router of claim 13, wherein the transceiver is further configured to transmit OSPF communications including the derived OSPF configuration for the router to the second router.

15. The router of claim 13, wherein the OSPF configuration for the router comprises an OSPF area identification (ID), an OSPF interval, or maximum transfer unit (MTU) information.

16. The router of claim 13, wherein the received OSPF communications from the second router comprise an OSPF hello packet from the second router.

17. The router of claim 16, wherein the OSPF configuration for the router comprises an OSPF area identification (ID) that matches an OSPF ID in the OSPF hello packet from the second router or an OSPF interval that matches an OSPF interval in the OSPF hello packet from the second router.

18. The router of claim 13, wherein the received OSPF communications from the second router comprise an OSPF database description (DD) packet from the second router.

19. The router of claim 18, wherein the OSPF configuration for the router comprises an OSPF area identification (ID) that matches an OSPF ID in the OSPF DD packet from the second router or maximum transfer unit (MTU) information that matches MTU information in the OSPF DD packet from the second router.

20. A method for automatic Open Shortest Path First (OSPF) configuration, the method comprising:
    at a first router, receiving an OSPF hello packet from a second router; and
    at the first router, deriving OSPF configuration for the first router from the OSPF hello packet to match OSPF configuration of the second router, wherein the OSPF configuration for the first router comprises an OSPF area identification (ID) or an OSPF interval.

* * * * *